United States Patent
Kim et al.

(10) Patent No.: US 11,698,476 B2
(45) Date of Patent: Jul. 11, 2023

(54) POLARIZING PLATE AND OPTICAL DISPLAY APPARATUS COMPRISING THE SAME

(71) Applicant: SAMSUNG SDI CO., LTD., Yongin-si (KR)

(72) Inventors: Do Won Kim, Suwon-si (KR); Han Saem Kang, Suwon-si (KR); Kwang Ho Shin, Suwon-si (KR); Sung Man Cho, Suwon-si (KR); Eun Sol Cho, Suwon-si (KR); Seon Oh Hwang, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/396,303

(22) Filed: Aug. 6, 2021

(65) Prior Publication Data
US 2022/0043188 A1    Feb. 10, 2022

(30) Foreign Application Priority Data
Aug. 10, 2020    (KR) .................... 10-2020-0099645

(51) Int. Cl.
*G02B 1/14*    (2015.01)
*G02B 5/30*    (2006.01)
*B32B 7/12*    (2006.01)
*B32B 27/30*    (2006.01)
*B32B 27/08*    (2006.01)

(52) U.S. Cl.
CPC .................. *G02B 1/14* (2015.01); *B32B 7/12* (2013.01); *B32B 27/08* (2013.01); *B32B 27/306* (2013.01); *G02B 5/3025* (2013.01); *B32B 2250/02* (2013.01); *B32B 2250/24* (2013.01); *B32B 2307/42* (2013.01); *B32B 2307/73* (2013.01); *B32B 2307/732* (2013.01)

(58) Field of Classification Search
CPC ...... B32B 27/306; G02B 5/30; G02B 5/3025; G02B 5/3033; G02B 5/3041; G02B 5/305
See application file for complete search history.

(56) References Cited

U.S. PATENT DOCUMENTS

2012/0327512 A1 * 12/2012 Goto .................... G02B 5/3033
359/487.01

FOREIGN PATENT DOCUMENTS

| KR | 10-2013-0078606 A | 7/2013 | |
|---|---|---|---|
| WO | WO-2010100917 A1 * | 9/2010 | ........... G02B 5/3033 |
| WO | WO-2019058778 A1 * | 3/2019 | ............. B32B 27/08 |

OTHER PUBLICATIONS

Machine Translation of WO 2019-058778 (Year: 2019).*

* cited by examiner

*Primary Examiner* — Zachary M Davis
(74) *Attorney, Agent, or Firm* — Lewis Roca Rothgerber Christie LLP

(57) ABSTRACT

A polarizing plate and an optical display apparatus including the same are provided. A polarizing plate includes a polarizer and a protective film stacked on at least one surface of the polarizer, and the polarizer includes a hydrophobic polyvinyl alcohol resin, the polarizer has a surface roughness (Ra) of about 10 nm or less on a surface thereof facing the protective film, and the polarizing plate has a maximum metal ion-infiltration length of about 400 μm or less between the polarizer and the protective film when metal powder-containing pastes are deposited on a surface of the polarizing plate in a thickness direction thereof and left at 60° C. and 95% relative humidity (RH) for 240 hours.

18 Claims, 4 Drawing Sheets

POLARIZING PLATE AND OPTICAL DISPLAY APPARATUS COMPRISING THE SAME

CROSS-REFERENCE TO RELATED APPLICATION

This application claims priority to and the benefit of Korean Patent Application No. 10-2020-0099645, filed on Aug. 10, 2020 in the Korean Intellectual Property Office, the entire disclosure of which is incorporated herein by reference.

BACKGROUND

1. Field

Aspects of embodiments of the present invention relate to a polarizing plate and an optical display apparatus including the same.

2. Description of the Related Art

A liquid crystal display includes a polarizing plate bonded to both sides of a liquid crystal panel via an adhesive layer, for example, a pressure-sensitive adhesive (PSA) layer. Conventionally, the liquid crystal display adopts an add-on type structure in which a touch panel or a touch sensor independent of the liquid crystal panel is stacked on one or both sides of the liquid crystal panel. However, the add-on type has a problem of increasing the thickness of the liquid crystal display. To address this problem, an in-cell type liquid crystal display having a touch panel or a touch sensor inside a liquid crystal panel is used.

The in-cell type liquid crystal display includes the touch panel or the touch sensor inside the liquid crystal panel. The in-cell type liquid crystal display is manufactured by bonding a polarizing plate having a release film bonded thereto via an adhesive layer to both sides of the liquid crystal panel via a pressure-sensitive adhesive, followed by removing the release film, which has the adhesive layer attached thereto, from the polarizing plate. The release film (for example, a polyethylene terephthalate (PET) film) having the adhesive layer attached thereto is a process film for protecting the polarizing plate from foreign substances and is removed from the polarizing plate after the polarizing plate is bonded to both sides of the liquid crystal panel.

However, static electricity can be generated in the course of removing the release film from the polarizing plate. Moreover, static electricity can be applied to the liquid crystal display in the process of manufacturing the liquid crystal display. The static electricity can influence the touch panel or the touch sensor inside the liquid crystal panel.

In order to prevent the static electricity from damaging the liquid crystal panel, the static electricity must be dissipated. To this end, the polarizing plate may be subjected to ESD treatment by coating metal powder-containing pastes, for example, silver powder-containing pastes, on the polarizing plate in a thickness direction thereof. Here, the silver powder in the pastes generates silver ions (Ag+) through ionization upon contact with heat, moisture, or an acid. The silver ions infiltrate between the polarizer and the protective film, between the protective film and the pressure-sensitive adhesive layer, or between the pressure-sensitive adhesive layer and the liquid crystal panel. The infiltrated silver ions grow into silver crystals, which can reduce luminous efficacy of light emitted from the liquid crystal panel. In particular, the silver ions having infiltrated between the polarizer and the protective film or the silver crystals generated therefrom affect light passing through the polarizer, thereby affecting a polarization function of the polarizing plate. Therefore, there is a need for development of a polarizing plate that minimizes or reduces infiltration of the silver ions between the polarizer and the protective film while enabling removal of static electricity from the polarizing plate.

The background technique of the present invention is disclosed in KR Patent Laid-open Publication No. 10-2013-0078606 and the like.

SUMMARY

According to an aspect of embodiments of the present invention, a polarizing plate is provided that minimizes or reduces infiltration of metal ions between a polarizer and a protective film when metal powder-containing pastes are deposited on the polarizing plate in a thickness direction and left at high temperature and/or under high temperature/high humidity conditions is provided. According to another aspect of embodiments of the present invention, an optical display apparatus including such a polarizing plate is provided.

One aspect of the present invention relates to a polarizing plate.

According to one or more embodiments, a polarizing plate includes a polarizer and a protective film stacked on at least one surface of the polarizer, wherein the polarizer includes a hydrophobic polyvinyl alcohol resin and has a surface roughness (Ra) of about 10 nm or less on a surface thereof facing the protective film, and the polarizing plate has a maximum metal ion-infiltration length of about 400 μm or less between the polarizer and the protective film when metal powder-containing pastes are deposited on a surface of the polarizing plate in a thickness direction thereof and left at 60° C. and 95% relative humidity (RH) for 240 hours.

In one or more embodiments, the polarizer may have a surface roughness (Rz) of about 0 nm to about 80 nm on the surface thereof facing the protective film and a surface roughness (Rq) of about 0 nm to about 20 nm on the surface thereof facing the protective film.

In one or more embodiments, the polarizer may have a difference of about 5 nm or less in surface roughness (Ra) between opposite surfaces thereof.

In one or more embodiments, the hydrophobic polyvinyl alcohol resin may contain an unsubstituted $C_1$ to $C_{20}$ hydrocarbon group as a hydrophobic functional group.

In one or more embodiments, the hydrophobic polyvinyl alcohol resin may include a copolymer of a monomer mixture including at least one vinyl ester monomer and a monomer providing a hydrophobic functional group.

In one or more embodiments, the monomer providing the hydrophobic functional group may include a monomer having a $C_1$ to $C_{20}$ hydrocarbon repeat unit.

In one or more embodiments, the polarizer may have a thickness of about 12 μm or less.

In one or more embodiments, the protective film may include at least one selected from among a cellulose ester resin, a cyclic polyolefin resin, a polycarbonate resin, a polyester resin, a polyether sulfone resin, a polysulfone resin, a polyamide resin, a polyimide resin, a non-cyclic polyolefin resin, a polyacrylate resin, a polyvinyl alcohol resin, a polyvinyl chloride resin, a polyvinylidene chloride resin, and an acrylic resin.

In one or more embodiments, the polarizer may be bonded to the protective film via a bonding layer, the bonding layer having a thickness of about 0.01 µm to about 10 µm.

Another aspect of the present invention relates to an optical display apparatus.

According to one or more embodiments, the optical display apparatus includes the polarizing plate according to an embodiment of the present invention.

According to an aspect of embodiments of the present invention, a polarizing plate is provided that minimizes or reduces infiltration of metal ions between a polarizer and a protective film when metal powder-containing pastes are deposited on the polarizing plate in a thickness direction and left at high temperature and/or under high temperature/high humidity conditions.

DETAILED DESCRIPTION

Figure 1A:
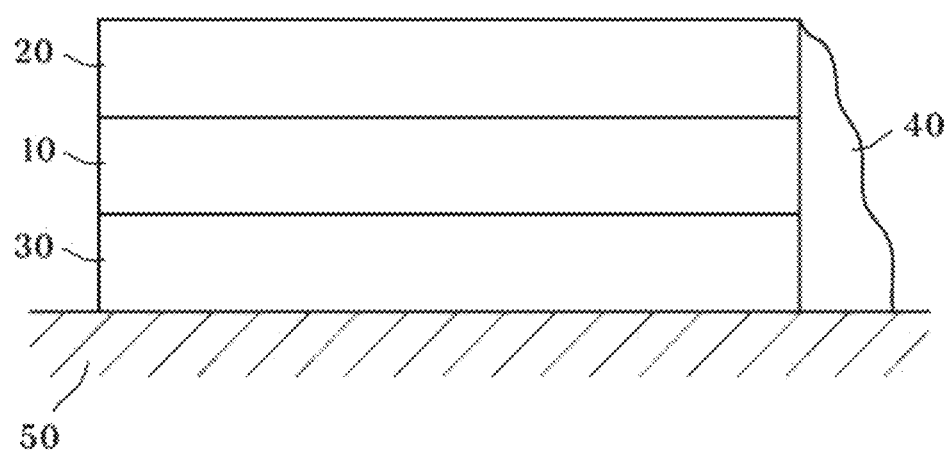
FIGS. 1A and 1B are cross-sectional views of a polarizing plate according to an embodiment of the present invention, in which metal pastes are deposited on the polarizing plate in a thickness direction thereof.

Embodiments of the present invention will be described in further detail with reference to the accompanying drawings to provide a thorough understanding of the invention to those skilled in the art. It should be understood that the present invention may be embodied in different ways and is not limited to the following embodiments.

Herein, the "maximum metal ion-infiltration length" in a polarizing plate means the maximum value among metal ion-infiltration lengths between a polarizer and a protective film of the polarizing plate when metal powder-containing pastes are deposited on a surface of the polarizing plate in a thickness direction thereof and left at 60° C. and 95% RH for 240 hours.

In an embodiment, metal ions may be derived from the metal powder-containing pastes. Upon contact with heat, moisture, or an acid, the metal powder-containing pastes are ionized to generate metal cations. For example, silver powder-containing pastes generate silver ions ($Ag^+$).

The infiltrated metal cations grow into metal crystals. For example, the silver powder-containing pastes generate silver cations. The metal ion-infiltration length may be measured using an optical microscope (ML61L, Olympus Co., Ltd.).

In an embodiment, the metal powder-containing pastes include about 40 wt % to about 90 wt % of metal powder having an average particle diameter (D50) of about 1 µm to about 10 µm, about 5 wt % to about 30 wt % of a binder, and the balance of a solvent (for example, in an amount of about 3 wt % to about 60 wt %, or about 3 wt % to about 55 wt %).

The metal powder may include at least one selected from among silver (Ag) powder and platinum (Pt) powder. In an embodiment, the metal powder may have a spherical shape, a flake shape, or an acicular shape. In an embodiment, the binder may include cellulose acetate propionate, cellulose acetate butyrate, or a mixture thereof, and the solvent may include at least one selected from among water, ethanol, butanol, and propylene glycol methyl acetate (PGMEA).

The metal powder-containing pastes may have a viscosity of about 50,000 cP to about 300,000 cP at a temperature of 20° C. to 25° C. Viscosity may be measured using a viscometer (DV-E, Brookfield Co., Ltd.).

The metal powder-containing pastes may be deposited, for example, by filling a syringe with the metal powder-containing pastes, followed by injecting the metal powder-containing pastes towards the surface of the polarizing plate in the thickness direction thereof, without being limited thereto.

After deposition of the metal powder-containing pastes on the polarizing plate in the thickness direction thereof, the metal powder-containing pastes may remain in an optical display apparatus adopting the polarizing plate or may be removed therefrom.

Herein, surface roughness Ra, Rz, and Rq of the polarizer is measured in a non-contact mode of an atomic force microscope (AFM).

As used herein to represent a specific numerical range, the expression "X to Y" means "greater than or equal to X and less than or equal to Y (X≤ and ≤Y)".

As used herein, the term "(meth)acryl" refers to acryl and/or methacryl.

Next, a polarizing plate according to an embodiment of the present invention will be described with reference to FIGS. 1A and 1B.

The polarizing plate according to an embodiment of the present invention includes a polarizer and a protective film stacked on at least one surface of the polarizer, wherein the polarizer includes a hydrophobic polyvinyl alcohol resin and has a surface roughness (Ra) of about 10 nm or less on a surface thereof facing the protective film. As a result, the polarizing plate according to the present invention has a maximum metal ion-infiltration length of about 400 µm or less and does not suffer from problems including bubble generation upon bonding of the polarizer to the protective film.

If the surface roughness Ra on the surface of the polarizer facing the protective film is about 10 nm or less and the polarizer contains a hydrophilic polyvinyl alcohol resin, the maximum metal ion-infiltration length of the polarizing plate can exceed about 400 µm. If the polarizer contains the hydrophobic polyvinyl alcohol resin and the surface roughness Ra on the surface of the polarizer facing the protective film exceeds about 10 nm, the maximum metal ion-infiltration length of the polarizing plate can exceed about 400 µm.

Figure 1B:
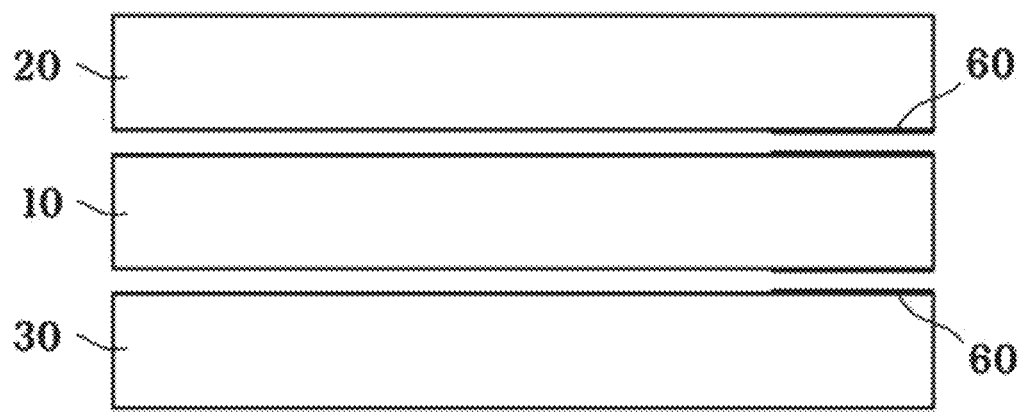

Referring to FIGS. 1A and 1B, the polarizing plate includes a polarizer 10, a first protective film 20, and a second protective film 30.

The polarizing plate may further include a release film (not shown in FIGS. 1A and 1B) bonded to an upper surface of the first protective film 20 via an adhesive layer to protect the polarizing plate. For application of the polarizing plate to an optical display apparatus, the polarizing plate is adhesively attached to an optical display panel via a pressure-sensitive adhesive layer (not shown in FIGS. 1A and 1B), and the release film having the adhesive layer attached thereto is peeled off of the polarizing plate.

However, static electricity can be generated in the course of removing the release film from the polarizing plate. Moreover, static electricity can be generated in a process of manufacturing an optical display apparatus. The static electricity can influence a touch panel or a touch sensor inside a liquid crystal panel. In order to remove the static electricity at the outside, metal powder-containing pastes 40 are deposited on a surface of the polarizing plate in the thickness direction thereof.

According to embodiments of the present invention, a maximum metal ion-infiltration length of about 400 μm or less is set to provide an effect of removing static electricity upon removal of a release film from the polarizing plate after the release film having an adhesive layer attached to a surface thereof is stacked on the polarizing plate, without affecting a polarization function and luminous efficacy of the polarizing plate. In an embodiment, the maximum metal ion-infiltration length may be greater than about 0 μm to about 400 μm, and, in an embodiment, about 0 μm to about 200 μm. For example, the maximum metal ion-infiltration length may be about 0 μm, 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, 310 μm, 320 μm, 330 μm, 340 μm, 350 μm, 360 μm, 370 μm, 380 μm, 390 μm, or 400 μm.

In an embodiment, the polarizer may have a surface roughness (Ra) of greater than about 1.0 nm to about 10 nm, and, in an embodiment, about 1.1 nm to about 10 nm, on a surface thereof facing the protective film. Within this range, the polarizing plate can have a maximum metal ion-infiltration length of about 400 μm or less and allows easy manufacture of the polarizer without affecting the polarization function. For example, the polarizer may have a surface roughness (Ra) of about 1.1 nm, 1.2 nm, 1.3 nm, 1.4 nm, 1.5 nm, 1.6 nm, 1.7 nm, 1.8 nm, 1.9 nm, 2 nm, 2.5 nm, 3 nm, 3.5 nm, 4 nm, 4.5 nm, 5 nm, 5.5 nm, 6 nm, 6.5 nm, 7 nm, 7.5 nm, 8 nm, 8.5 nm, 9 nm, 9.5 nm, or 10 nm on the surface thereof facing the protective film.

FIGS. 1A and 1B are cross-sectional views of a polarizing plate according to an embodiment of the present invention, in which metal pastes are deposited on the polarizing plate in the thickness direction thereof.

Referring to FIG. 1A, when metal powder-containing pastes 40 are deposited on the surface of the polarizing plate in the thickness direction thereof with the polarizing plate adhesively attached to a matrix 50, such as a glass plate or the like, the metal powder-containing pastes 40 form a coating layer, thereby providing an ESD effect. Metal ions derived from the metal powder-containing pastes 40 can infiltrate a gap between the polarizer 10 and the first protective film 20 and a gap between the polarizer 10 and the second protective film 30.

FIG. 1B is an exploded perspective view of the polarizing plate shown in FIG. 1A. Referring to FIG. 1B, the metal ions derived from the metal powder-containing pastes can infiltrate the gap between the polarizer 10 and the first protective film 20 and the gap between the polarizer 10 and the second protective film 30. Thus, a metal ion-infiltration length 60 can be measured.

Figure 2:
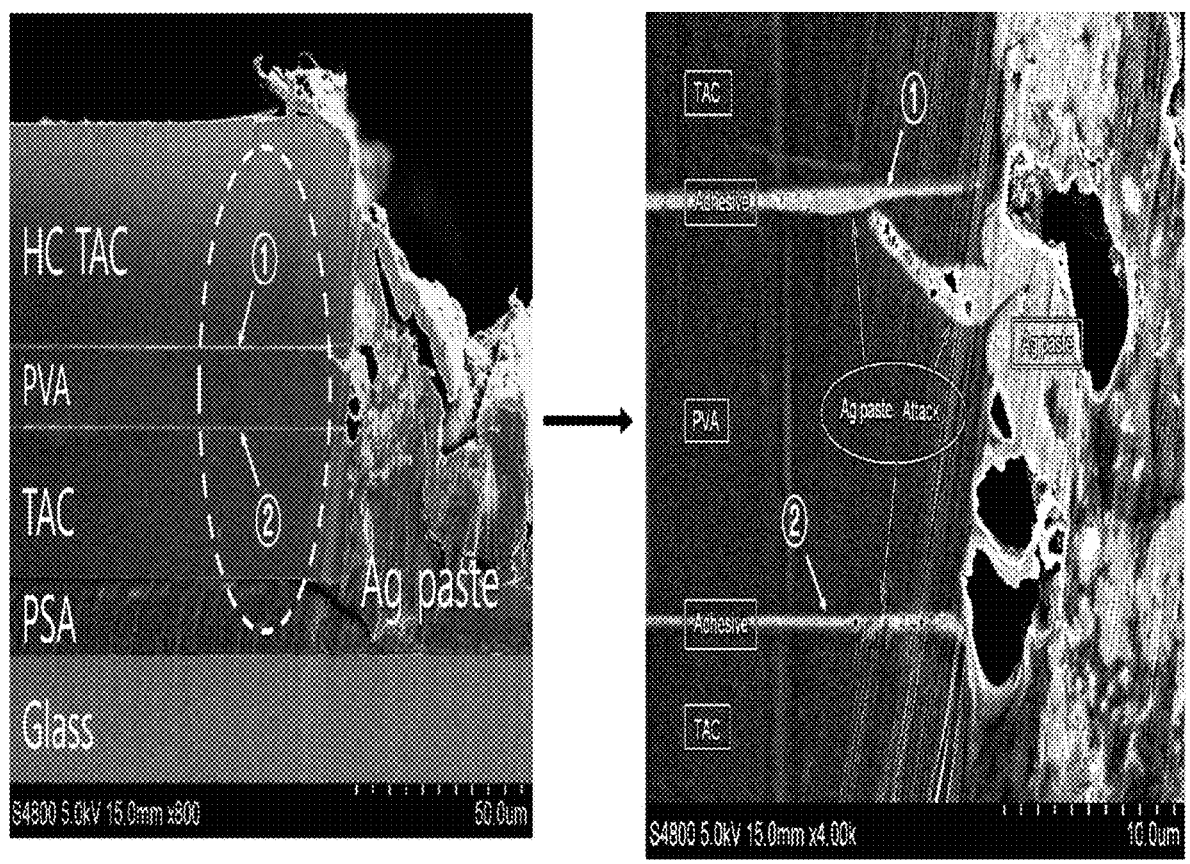
FIG. 2 is a scanning electron micrograph (SEM) and an enlarged view of a cross-section of the polarizing plate according to an embodiment, in which the metal pastes are deposited on the polarizing plate in the thickness direction thereof.

FIG. 2 is a scanning electron micrograph (SEM) and an enlarged view of a cross-section of the polarizing plate according to an embodiment, in which the metal pastes are deposited on the polarizing plate in the thickness direction thereof.

Referring to FIG. 2, a polarizing plate including a triacetylcellulose (TAC) film, a polarizer (PVA), and a hard coating triacetylcellulose (HC TAC) film is stacked on a glass plate via a pressure-sensitive adhesive (PSA), silver (Ag) pastes are deposited on the polarizing plate in the thickness direction thereof, and metal ions infiltrate the polarizing plate, as indicated by ① and ②.

The maximum metal ion-infiltration length according to one or more embodiments of the present invention may be achieved by the polarizing plate that contains the hydrophobic polyvinyl alcohol resin and includes the polarizer having a surface roughness (Ra) of about 10 nm or less on the surface thereof facing the protective film.

The "hydrophobic polyvinyl alcohol resin" means a polyvinyl alcohol resin that contains a hydrophobic functional group alone or in a greater amount of the hydrophobic functional group than an amount of a hydrophilic functional group among multiple functional groups in the polyvinyl alcohol resin.

In addition, the "hydrophilic polyvinyl alcohol resin" means a polyvinyl alcohol resin that contains a hydrophilic functional group alone or in a greater amount of the hydrophilic functional group than an amount of a hydrophobic functional group among multiple functional groups in the polyvinyl alcohol resin.

In an embodiment, the "hydrophobic functional group" refers to an unsubstituted $C_1$ to $C_{20}$, and, in an embodiment, $C_1$ to $C_{10}$, and, in an embodiment, $C_2$ to $C_5$ hydrocarbon group. In an embodiment, the "hydrophilic functional group" refers to a functional group other than the hydrophobic functional group.

A polyvinyl alcohol resin film contains a hydrophobic functional group. The polyvinyl alcohol film containing the hydrophobic functional group is manufactured by a process described below, whereby the polarizer can easily achieve a surface roughness (Ra) of about 10 nm or less on the surface thereof facing the protective film.

The hydrophobic functional group may be present on at least one of a main chain and a sidechain of the polyvinyl alcohol resin constituting the polyvinyl alcohol film. The "main chain" refers to a portion forming a backbone of the polyvinyl alcohol resin and the "sidechain" refers to a portion connected to the backbone. In an embodiment, the hydrophobic functional group is present on the main chain of the polyvinyl alcohol resin.

The polyvinyl alcohol resin film may further contain a hydrophilic functional group (for example: —OH). The hydrophilic functional group facilitates dyeing.

In an embodiment, the polyvinyl alcohol resin film may include a copolymer of a monomer mixture including a monomer providing a hydrophobic functional group and at least one type of vinyl ester monomer, such as vinyl acetate, vinyl formate, vinyl propionate, vinyl butyrate, vinyl pivalate, and isopropenyl acetate. In an embodiment, the vinyl ester monomer may include vinyl acetate. The monomer providing a hydrophobic functional group may include a monomer having a $C_1$ to $C_{20}$, and, in an embodiment, $C_1$ to $C_{10}$, and, in an embodiment, $C_2$ to $C_5$ hydrocarbon (for example, alkylene) repeat unit including ethylene, propylene, butylene, pentylene, hexylene, heptylene, octylene, nonylene, and decylene repeat units.

In an embodiment, the polyvinyl alcohol resin film may have a softening point of about 65° C. to about 80° C., for example, about 65° C. to about 71° C., and, in an embodiment, about 66° C. to about 69° C. Within this range, the polyvinyl alcohol resin film is not melted or fractured in a stretching process and allows easy manufacture of the polarizer according to the present invention. For example, the polyvinyl alcohol resin film may have a softening point of about 65° C., about 66° C., about 67° C., about 68° C., about 69° C., about 70° C., about 71° C., about 72° C., about 73° C., about 74° C., about 75° C., about 76° C., about 77° C., about 78° C., about 79° C., or about 80° C.

In an embodiment, the polyvinyl alcohol resin film may have a tensile strength of about 80 MPa to about 120 MPa, and, in an embodiment, about 90 MPa to about 110 MPa, as measured in a machine direction thereof. Within this range, the polyvinyl alcohol resin film is not melted or fractured in the stretching process, can increase the degree of polarization through effective alignment of polyvinyl alcohol molecule chains, and allows easy manufacture of the polarizer according to the present invention. Tensile strength of the polyvinyl alcohol resin film may be measured at 25° C. using a universal testing machine (UTM) in accordance with ASTM D882. For example, the polyvinyl alcohol resin film may have a tensile strength of about 80 MPa, about 81 MPa, about 82 MPa, about 83 MPa, about 84 MPa, about 85 MPa, about 86 MPa, about 87 MPa, about 88 MPa, about 89 MPa, about 90 MPa, about 91 MPa, about 92 MPa, about 93 MPa, about 94 MPa, about 95 MPa, about 96 MPa, about 97 MPa, about 98 MPa, about 99 MPa, about 100 MPa, about 101 MPa, about 102 MPa, about 103 MPa, about 104 MPa, about 105 MPa, about 106 MPa, about 107 MPa, about 108 MPa, about 109 MPa, about 110 MPa, about 111 MPa, about 112 MPa, about 113 MPa, about 114 MPa, about 115 MPa, about 116 MPa, about 117 MPa, about 118 MPa, about 119 MPa, or about 120 MPa, as measured in the machine direction thereof.

In an embodiment, the polyvinyl alcohol resin film may have a thickness of about 50 μm or less, for example, greater than about 0 μm to about 50 μm or less, and, in an embodiment, about 10 μm to about 50 μm. Within this range, the polyvinyl alcohol resin film is not melted or fractured in the stretching process. For example, the polyvinyl alcohol resin film may have a thickness of about 0.01 μm, about 0.05 μm, about 0.1 μm, about 0.5 μm, about 1 μm, about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, about 23 μm, about 24 μm, about 25 μm, about 26 μm, about 27 μm, about 28 μm, about 29 μm, about 30 μm, about 31 μm, about 32 μm, about 33 μm, about 34 μm, about 35 μm, about 36 μm, about 37 μm, about 38 μm, about 39 μm, about 40 μm, about 41 μm, about 42 μm, about 43 μm, about 44 μm, about 45 μm, about 46 μm, about 47 μm, about 48 μm, about 49 μm, or about 50 μm.

The polyvinyl alcohol resin film may be a VF-TS#2000 PVA film (Kuraray Co., Ltd.).

The polarizer is manufactured by processing the polyvinyl alcohol film in the sequence of dyeing, crosslinking, and stretching processes. As a result, the polarizer can easily achieve a surface roughness (Ra) of about 10 nm or less on the surface thereof facing the protective film.

The dyeing process includes treatment of the polyvinyl alcohol film in a dichroic material-containing dyeing bath. In the dyeing process, the polyvinyl alcohol film is dipped in the dichroic material-containing dyeing bath. The dichroic material-containing dyeing bath is filled with an aqueous dyeing solution that includes the dichroic material and a boron compound. As the dyeing solution contains both the dichroic material and the boron compound, it is possible to prevent the dyed polyvinyl alcohol film from being fractured in the stretching process under conditions described below.

The dichroic material may be an iodine compound and may include at least one selected from among potassium iodide, hydrogen iodide, lithium iodide, sodium iodide, zinc iodide, lithium iodide, aluminum iodide, lead iodide, and copper iodide. In an embodiment, the dichroic material is present in an amount of about 0.5 mol/ml to about 10 mol/ml, and, in an embodiment, about 0.5 mol/ml to about 5 mol/ml in the dyeing bath, and, in an embodiment, in the dyeing solution. Within this range, the polyvinyl alcohol film can be uniformly dyed. For example, the dichroic material may be present in an amount of about 0.5 mol/ml, about 0.6 mol/ml, about 0.7 mol/ml, about 0.8 mol/ml, about 0.9 mol/ml, about 1 mol/ml, about 1.5 mol/ml, about 2 mol/ml, about 2.5 mol/ml, about 3 mol/ml, about 3.5 mol/ml, about 4 mol/ml, about 4.5 mol/ml, about 5 mol/ml, about 5.5 mol/ml, about 6 mol/ml, about 6.5 mol/ml, about 7 mol/ml, about 7.5 mol/ml, about 8 mol/ml, about 8.5 mol/ml, about 9 mol/ml, about 9.5 mol/ml, or about 10 mol/ml in the dyeing bath, and, in an embodiment, in the dyeing solution.

The boron compound can assist in preventing or substantially preventing the polyvinyl alcohol film from being melted or fractured upon stretching the polyvinyl alcohol film. The boron compound can assist in preventing or substantially preventing the polyvinyl alcohol film from being melted or fractured even upon stretching the polyvinyl alcohol film at high elongation and at high temperature after the dyeing process.

The boron compound may include at least one selected from among boric acid and borax. In an embodiment, the boron compound is present in an amount of about 0.1 wt % to about 5 wt %, and, in an embodiment, about 0.3 wt % to about 3 wt % in the dyeing bath, and, in an embodiment, in the dyeing solution. Within this range, the polyvinyl alcohol film can be dyed and can exhibit high reliability without suffering from melting and fracture. For example, the boron compound may be present in an amount of about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.5 wt %, about 2 wt %, about 2.5 wt %, about 3 wt %, about 3.5 wt %, about 4 wt %, about 4.5 wt %, or about 5 wt % in the dyeing bath, and, in an embodiment, in the dyeing solution.

In an embodiment, the dyeing solution may have a temperature of about 20° C. to about 50° C., and, in an embodiment, about 25° C. to about 40° C. In an embodiment, in the dyeing process, the polyvinyl alcohol film may be dipped in the dyeing bath for about 30 seconds to about 120 seconds, and, in an embodiment, about 40 seconds to about 80 seconds.

For example, the dyeing solution may have a temperature of about 20° C., about 21° C., about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., about 40° C., about 41° C., about 42° C., about 43° C., about 44° C., about 45° C., about 46° C., about 47° C., about 48° C., about 49° C., or about 50° C. For example, in the dyeing process, the polyvinyl alcohol film may be dipped in the dyeing bath for about 30 seconds, about 35 seconds, about 40 seconds, about 45 seconds, about 50 seconds, about 55 seconds, about 60 seconds, about 65 seconds, about 70 seconds, about 75 seconds, about 80 seconds, about 85 seconds, about 90 seconds, about 95 seconds, about 100 seconds, about 105 seconds, about 110 seconds, about 115 seconds, or about 120 seconds.

The crosslinking process is performed to allow strong adsorption of the dichroic material to the polyvinyl alcohol film subjected to the dyeing process. A crosslinking solution used in the crosslinking process includes a boron compound. The boron compound can assist in achieving strong adsorption of the dichroic material while improving reliability even when the polarizer is left under thermal shock.

The boron compound may include at least one selected from among boric acid and borax. In an embodiment, the boron compound is present in an amount of about 0.5 wt % to about 10 wt %, and, in an embodiment, about 1 wt % to about 5 wt %, in a crosslinking bath, and, in an embodiment, in a crosslinking solution. Within this range, the polyvinyl alcohol film can be stretched and can exhibit high reliability while achieving surface roughness of the polarizer according to the present invention without melting and fracture. For example, the boron compound may be present in an amount of about 0.5 wt %, about 0.6 wt %, about 0.7 wt %, about 0.8 wt %, about 0.9 wt %, about 1 wt %, about 1.5 wt %, about 2 wt %, about 2.5 wt %, about 3 wt %, about 3.5 wt %, about 4 wt %, about 4.5 wt %, about 5 wt %, about 5.5 wt %, about 6 wt %, about 6.5 wt %, about 7 wt %, about 7.5 wt %, about 8 wt %, about 8.5 wt %, about 9 wt %, about 9.5 wt %, or about 10 wt % in the crosslinking bath, and, in an embodiment, in the crosslinking solution.

In an embodiment, the crosslinking bath may have a temperature of about 20° C. to about 50° C., and, in an embodiment, about 25° C. to about 40° C. In an embodiment, in the crosslinking process, the polyvinyl alcohol film may be dipped in the crosslinking bath for about 30 seconds to about 120 seconds, and, in an embodiment, about 30 seconds to about 80 seconds.

For example, the crosslinking bath may be set to about 20° C., about 21° C., about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., about 40° C., about 41° C., about 42° C., about 43° C., about 44° C., about 45° C., about 46° C., about 47° C., about 48° C., about 49° C., or about 50° C. For example, the crosslinking process may be performed by dipping the polyvinyl alcohol film in the crosslinking bath for about 30 seconds, about 35 seconds, about 40 seconds, about 45 seconds, about 50 seconds, about 55 seconds, about 60 seconds, about 65 seconds, about 70 seconds, about 75 seconds, about 80 seconds, about 85 seconds, about 90 seconds, about 95 seconds, about 100 seconds, about 105 seconds, about 110 seconds, about 115 seconds, or about 120 seconds.

The stretching process includes stretching the dyed polyvinyl alcohol film at an elongation ratio (e.g., a predetermined elongation ratio) and at a temperature of about 50° C. or more, for example, about 50° C. to about 70° C. Typically, when a conventional polyvinyl alcohol film is stretched at the above elongation ratio and at the stretching temperature, the polarizer cannot be manufactured because of melting and/or fracture of the conventional polyvinyl alcohol film. On the contrary, within the above ranges, the polarizer can have surface roughness according to the present invention. For example, in the stretching process, the dyed polyvinyl alcohol film may be stretched at an elongation ratio (e.g., a predetermined elongation ratio) and at about 50° C., about 51° C., about 52° C., about 53° C., about 54° C., about 55° C., about 56° C., about 57° C., about 58° C., about 59° C., about 60° C., about 61° C., about 62° C., about 63° C., about 64° C., about 65° C., about 66° C., about 67° C., about 68° C., about 69° C., or about 70° C.

In an embodiment, in manufacture of the polarizer according to the present invention, the polyvinyl alcohol film is stretched to a total elongation of about 5.0 times or more of an initial length thereof, for example, about 5.0 times to about 7 times, and, in an embodiment, about 5.4 times to about 6.5 times, through the dyeing process, the crosslinking process, and the stretching process. Here, the "total elongation" is a value obtained by multiplying the elongation ratios of the processes. For example, in manufacture of the polarizer, the polyvinyl alcohol film may be stretched to a total elongation of about 5 times, about 5.1 times, about 5.2 times, about 5.3 times, about 5.4 times, about 5.5 times, about 5.6 times, about 5.7 times, about 5.8 times, about 5.9 times, about 6 times, about 6.1 times, about 6.2 times, about 6.3 times, about 6.4 times, about 6.5 times, about 6.6 times, about 6.7 times, about 6.8 times, about 6.9 times, or about 7.0 times.

The stretching process may be realized by wet stretching or dry stretching. In an embodiment, the stretching process includes wet stretching to apply a boron compound to the polyvinyl alcohol film. Wet stretching includes uniaxially stretching the polyvinyl alcohol film in an aqueous solution containing the boron compound in the machine direction.

The boron compound may include at least one selected from among boric acid and borax, and, in an embodiment, boric acid. In an embodiment, the boron compound is present in an amount of about 0.5 wt % to less than about 3.5 wt %, and, in an embodiment, about 1 wt % to about 3.4 wt % in a stretching bath, and, in an embodiment, in a stretching solution. Within this range, the polarizer can have surface roughness according to the present invention and can achieve high reliability without melting and fracture in the stretching process. For example, the boron compound may be present in an amount of about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, about 2 wt %, about 2.1 wt %, about 2.2 wt %, about 2.3 wt %, about 2.4 wt %, about 2.5 wt %, about 2.6 wt %, about 2.7 wt %, about 2.8 wt %, about 2.9 wt %, about 3 wt %, about 3.1 wt %, about 3.2 wt %, about 3.3 wt %, or about 3.4 wt % in the stretching bath, and, in an embodiment, in the stretching solution.

In an embodiment, the polarizer may contain about 2.0 wt % to about 4.0 wt %, and, in an embodiment, about 2.5 wt % to about 3.5 wt %, of the boron compound. Within this range, the polarizer can have surface roughness according to the present invention. For example, in the polarizer, the boron compound may be present in an amount of about 2 wt %, about 2.1 wt %, about 2.2 wt %, about 2.3 wt %, about 2.4 wt %, about 2.5 wt %, about 2.6 wt %, about 2.7 wt %, about 2.8 wt %, about 2.9 wt %, about 3 wt %, about 3.1 wt %, about 3.2 wt %, about 3.3 wt %, about 3.4 wt %, about 3.5 wt %, about 3.6 wt %, about 3.7 wt %, about 3.8 wt %, about 3.9 wt %, or about 4 wt %.

Before the dyeing process, the polyvinyl alcohol film may be subjected to at least one of a washing process and a swelling process.

The washing process is a process of washing the polyvinyl alcohol film with water to remove foreign substances from the polyvinyl alcohol film.

In the swelling process, the polyvinyl alcohol film is dipped in a swelling bath at a temperature (e.g., a predetermined temperature) to facilitate dyeing and stretching of the dichroic material. In an embodiment, the swelling process includes a process of swelling the polyvinyl alcohol film at about 15° C. to about 35° C., and, in an embodiment, at about 20° C. to about 30° C., for about 30 seconds to about 50 seconds. Within this range, the polarizer according to the present invention can be effectively realized.

In an embodiment, in manufacture of the polarizer according to the present invention, the polyvinyl alcohol film is stretched to a total elongation of about 5.0 times or more of an initial length thereof, for example, about 5.0 times to about 7 times, and, in an embodiment, about 5.4 times to about 6.5 times, through the washing process, the swelling process, the dyeing process, the crosslinking process, and the stretching process. For example, in manufacture of the polarizer, the polyvinyl alcohol film may be stretched to a total elongation of about 5 times, about 5.1 times, about 5.2 times, about 5.3 times, about 5.4 times, about 5.5 times, about 5.6 times, about 5.7 times, about 5.8 times, about 5.9 times, about 6 times, about 6.1 times, about 6.2 times, about 6.3 times, about 6.4 times, about 6.5 times, about 6.6 times, about 6.7 times, about 6.8 times, about 6.9 times, or about 7.0 times.

After the stretching process, the polyvinyl alcohol film may be further subjected to a color-correcting process.

Color correction can improve durability of the polyvinyl alcohol film. In an embodiment, a color-correcting bath may contain more than about 0 wt % and about 10 wt % or less, and, in an embodiment, about 1 wt % to about 5 wt %, of potassium iodide. Within this range, the polarizer according to the present invention can be effectively realized. For example, the color-correcting bath may contain the potassium iodide in an amount of about 0.01 wt %, about 0.05 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.5 wt %, about 2 wt %, about 2.5 wt %, about 3 wt %, about 3.5 wt %, about 4 wt %, about 4.5 wt %, about 5 wt %, about 5.5 wt %, about 6 wt %, about 6.5 wt %, about 7 wt %, about 7.5 wt %, about 8 wt %, about 8.5 wt %, about 9 wt %, about 9.5 wt %, or about 10 wt %.

In an embodiment, the color-correcting bath may be set to a temperature of about 20° C. to about 50° C., and, in an embodiment, about 20° C. to about 40° C. In the color-correcting process, the polyvinyl alcohol film may be dipped in the color-correcting bath for about 10 seconds to about 120 seconds, and, in an embodiment, about 10 seconds to about 80 seconds. Within this range, the polarizer according to the present invention can be effectively realized.

For example, the color-correcting bath may be set to about 20° C., about 21° C., about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., about 40° C., about 41° C., about 42° C., about 43° C., about 44° C., about 45° C., about 46° C., about 47° C., about 48° C., about 49° C., or about 50° C. For example, in the color-correcting process, the polyvinyl alcohol film may be dipped in the color-correcting bath for about 10 seconds, about 15 seconds, about 20 seconds, about 25 seconds, about 30 seconds, about 35 seconds, about 40 seconds, about 45 seconds, about 50 seconds, about 55 seconds, about 60 seconds, about 65 seconds, about 70 seconds, about 75 seconds, about 80 seconds, about 85 seconds, about 90 seconds, about 95 seconds, about 100 seconds, about 105 seconds, about 110 seconds, about 115 seconds, or about 120 seconds.

In an embodiment, after the color-correcting process, the polyvinyl alcohol film may have a temperature of about 50° C. to about 90° C., and, in an embodiment, about 50° C. to about 70° C. Within this range, the polarizer can have surface roughness according to the present invention.

For example, after the color-correcting process, the polyvinyl alcohol film may have a temperature of about 50° C., about 51° C., about 52° C., about 53° C., about 54° C., about 55° C., about 56° C., about 57° C., about 58° C., about 59° C., about 60° C., about 61° C., about 62° C., about 63° C., about 64° C., about 65° C., about 66° C., about 67° C., about 68° C., about 69° C., about 70° C., about 71° C., about 72° C., about 73° C., about 74° C., about 75° C., about 76° C., about 77° C., about 78° C., about 79° C., about 80° C., about 81° C., about 82° C., about 83° C., about 84° C., about 85° C., about 86° C., about 87° C., about 88° C., about 89° C., or about 90° C.

In an embodiment, the polarizer may include the hydrophobic polyvinyl alcohol resin and may be manufactured through the above manufacturing process, whereby opposite surfaces of the polarizer in the thickness direction thereof can have substantially the same surface roughness. As a result, even when the protective films are bonded to the opposite surfaces of the polarizer via bonding layers, the polarizer can have a maximum metal ion-infiltration length of about 400 μm or less on the opposite surfaces thereof.

For example, the polarizer may have a difference of about 5 nm or less, for example, about 0 nm to about 5 nm, and, in an embodiment, about 0 nm to about 3 nm in surface roughness Ra between the opposite surfaces thereof.

For example, the polarizer may have a difference of about 0 nm, about 0.01 nm, about 0.05 nm, about 0.1 nm, about 0.2 nm, about 0.3 nm, about 0.4 nm, about 0.5 nm, about 0.6 nm, about 0.7 nm, about 0.8 nm, about 0.9 nm, about 1 nm, about 1.1 nm, about 1.2 nm, about 1.3 nm, about 1.4 nm, about 1.5 nm, about 1.6 nm, about 1.7 nm, about 1.8 nm, about 1.9 nm, about 2 nm, about 2.1 nm, about 2.2 nm, about 2.3 nm, about 2.4 nm, about 2.5 nm, about 2.6 nm, about 2.7 nm, about 2.8 nm, about 2.9 nm, about 3 nm, about 3.1 nm, about 3.2 nm, about 3.3 nm, about 3.4 nm, about 3.5 nm, about 3.6 nm, about 3.7 nm, about 3.8 nm, about 3.9 nm, about 4 nm, about 4.1 nm, about 4.2 nm, about 4.3 nm, about 4.4 nm, about 4.5 nm, about 4.6 nm, about 4.7 nm, about 4.8 nm, about 4.9 nm, or about 5 nm, in surface roughness Ra between the opposite surfaces thereof.

In an embodiment, the polarizer may have a surface roughness Rz of about 0 nm to about 80 nm, for example, about 0 nm to about 75 nm on the surface thereof facing the protective film. Within this range, the polarizing plate can have a maximum metal ion-infiltration length of about 400 μm or less.

For example, the polarizer may have a surface roughness Rz of about 0 nm, about 0.01 nm, about 0.05 nm, about 0.1 nm, about 0.2 nm, about 0.3 nm, about 0.4 nm, about 0.5 nm, about 0.6 nm, about 0.7 nm, about 0.8 nm, about 0.9 nm, about 1 nm, about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, about 21 nm, about 22 nm, about 23 nm, about 24 nm, about 25 nm, about 26 nm, about 27 nm, about 28 nm, about 29 nm, about 30 nm, about 31 nm, about 32 nm, about 33 nm, about 34 nm, about 35 nm, about 36 nm, about 37 nm, about 38 nm, about 39 nm, about 40 nm, about 41 nm, about 42 nm, about 43 nm, about 44 nm, about 45 nm, about 46 nm, about 47 nm, about 48 nm, about 49 nm, about 50 nm, about 51 nm, about 52 nm, about 53 nm, about 54 nm, about 55 nm, about 56 nm, about 57 nm, about 58 nm, about 59 nm, about 60 nm, about 61 nm, about 62 nm, about 63 nm, about 64 nm, about 65 nm, about 66 nm, about 67 nm, about 68 nm, about 69 nm, about 70 nm, about 71 nm, about 72 nm, about 73 nm, about 74 nm, about 75 nm, about 76 nm, about 77 nm, about 78 nm, about 79 nm, or about 80 nm on the surface thereof facing the protective film.

In an embodiment, the polarizer may have a surface roughness Rq of about 0 nm to about 20 nm, for example, about 0 nm to about 15 nm on a surface thereof facing the protective film. Within this range, the polarizing plate can have a maximum metal ion-infiltration length of about 400 μm or less. For example, the polarizer may have a surface roughness Rq of about 0 nm, about 0.01 nm, about 0.05 nm, about 0.1 nm, about 0.2 nm, about 0.3 nm, about 0.4 nm, about 0.5 nm, about 0.6 nm, about 0.7 nm, about 0.8 nm, about 0.9 nm, about 1 nm, about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, or about 20 nm on the surface thereof facing the protective film.

In an embodiment, the polarizer 10 may have a thickness of about 12 μm or less. Within this range, the polarizing plate can have a reduced thickness. In an embodiment, the polarizer has a thickness of more than about 0 μm and about 12 μm or less, and, in an embodiment, more than about 0 μm and about 10 μm or less. For example, the polarizer may have a thickness of about 0.01 μm, about 0.05 μm, about 0.1 μm, about 0.2 μm, about 0.3 μm, about 0.4 μm, about 0.5 μm, about 0.6 μm, about 0.7 μm, about 0.8 μm, about 0.9 μm, about 1 μm, about 1.5 μm, about 2 μm, about 2.5 μm, about 3 μm, about 3.5 μm, about 4 μm, about 4.5 μm, about 5 μm, about 5.5 μm, about 6 μm, about 6.5 μm, about 7 μm, about 7.5 μm, about 8 μm, about 8.5 μm, about 9 μm, about 9.5 μm, about 10 μm, about 10.5 μm, about 11 μm, about 11.5 μm, or about 12 μm.

The first protective film 20 may be stacked on an upper surface of the polarizer 10 to protect the polarizer 10 while improving mechanical strength of the polarizing plate. The first protective film 20 may include an optically transparent protective film.

In an embodiment, the first protective film 20 may be formed by melting and extruding an optically transparent resin. In some embodiments, the resin may be further subjected to a stretching process. The resin may include at least one selected from among a cellulose ester resin including triacetylcellulose and the like, a cyclic polyolefin resin including a cyclic olefin polymer (COP) and the like, a polycarbonate resin, a polyester resin including polyethylene terephthalate (PET) and the like, a polyether sulfone resin, a polysulfone resin, a polyamide resin, a polyimide resin, a non-cyclic polyolefin resin, a polyacrylate resin including poly(methyl methacrylate) and the like, a polyvinyl alcohol resin, a polyvinyl chloride resin, a polyvinylidene chloride resin, and an acrylic resin.

In an embodiment, the first protective film 20 may include at least one selected from among a cellulose ester resin, a cyclic polyolefin resin, and a polyester resin.

In an embodiment, the first protective film 20 may have a thickness of about 5 μm to about 200 μm, and, in an embodiment, about 5 μm to about 100 μm, and, in an embodiment, about 20 μm to about 40 μm. Within this range, the first protective film can be used in the polarizing plate. For example, the first protective film 20 may have a thickness of about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, about 23 μm, about 24 μm, about 25 μm, about 26 μm, about 27 μm, about 28 μm, about 29 μm, about 30 μm, about 31 μm, about 32 μm, about 33 μm, about 34 μm, about 35 μm, about 36 μm, about 37 μm, about 38 μm, about 39 μm, about 40 μm, about 41 μm, about 42 μm, about 43 μm, about 44 μm, about 45 μm, about 46 μm, about 47 μm, about 48 μm, about 49 μm, about 50 μm, about 51 μm, about 52 μm, about 53 μm, about 54 μm, about 55 μm, about 56 μm, about 57 μm, about 58 μm, about 59 μm, about 60 μm, about 61 μm, about 62 μm, about 63 μm, about 64 μm, about 65 μm, about 66 μm, about 67 μm, about 68 μm, about 69 μm, about 70 μm, about 71 μm, about 72 μm, about 73 μm, about 74 μm, about 75 μm, about 76 μm, about 77 μm, about 78 μm, about 79 μm, about 80 μm, about 81 μm, about 82 μm, about 83 μm, about 84 μm, about 85 μm, about 86 μm, about 87 μm, about 88 μm, about 89 μm, about 90 μm, about 91 μm, about 92 μm, about 93 μm, about 94 μm, about 95 μm, about 96 μm, about 97 μm, about 98 μm, about 99 μm, about 100 μm, about 105 μm, about 110 μm, about 115 μm, about 120 μm, about 125 μm, about 130 μm, about 135 μm, about 140 μm, about 145 μm, about 150 μm, about 155 μm, about 160 μm, about 165 μm, about 170 μm, about 175 μm, about 180 μm, about 185 μm, about 190 μm, about 195 μm, or about 200 μm.

In an embodiment, the polarizing plate may further include a functional coating layer, for example, any of a hard coating layer, an anti-fingerprint layer, an antireflection layer, and the like, on an upper surface of the first protective film 20.

The second protective film 30 may be stacked on a lower surface of the polarizer 10 to protect the polarizer 10 while improving mechanical strength of the polarizing plate. The second protective film 30 may include a film formed of the same or different kind of resin from the first protective film 20.

In an embodiment, when the first protective film 20 is a cellulose ester resin film including triacetylcellulose and the like, the second protective film 30 may be a cellulose ester resin film including triacetylcellulose and the like.

In another embodiment, when the first protective film 20 is a polyester resin film including polyethylene terephthalate (PET) and the like, the second protective film 30 may be a cyclic polyolefin resin including a cyclic olefin polymer (COP) or a cellulose ester resin film including triacetylcellulose and the like.

The second protective film 30 may have the same thickness as or a different thickness than the first protective film 20.

In the polarizing plate, the first protective film 20 and the second protective film 30 may be bonded to the polarizer via bonding layers. The bonding layers may be formed of a typical bonding agent for polarizing plates well-known to those skilled in the art. For example, the bonding layers may be formed of a water-based bonding agent, a pressure-sensitive bonding agent, a heat curable bonding agent, or a photocurable bonding agent.

In an embodiment, the water-based bonding agent may include polyvinyl alcohol powder, a heat curable crosslinking agent, and water. The heat curable crosslinking agent may include an aldehyde-based crosslinking agent, such as formaldehyde, glyoxal, glutaraldehyde, and glyoxylic acid salts, and polyethylene imine-based crosslinking agents, without being limited thereto.

In an embodiment, the photocurable bonding agent may include an epoxy-based compound including an alicyclic epoxy compound, a (meth)acrylic compound including a hydroxyl group-containing (meth)acrylate, and an initiator. The initiator may include at least one selected from among a phosphorus-based photoradical initiator and a cationic photoinitiator including an onium salt, and, in an embodiment, a mixture of a photoradical initiator and a cationic photoinitiator. The photocurable bonding agent may further include typical additives, such as antioxidants, pigments, and the like.

In an embodiment, each of the bonding layers may have a thickness of about 0.01 µm to about 10 µm, for example, about 0.01 µm to about 1 µm, and, in an embodiment, about 0.05 µm to about 0.08 µm, or about 1 µm to about 10 µm, and, in an embodiment, about 2 µm to about 3 µm. Within these thickness ranges, the bonding layers can be used in an optical display apparatus. For example, each of the bonding layers may have a thickness of about 0.01 µm, about 0.02 µm, about 0.03 µm, about 0.04 µm, about 0.05 µm, about 0.06 µm, about 0.07 µm, about 0.08 µm, about 0.09 µm, about 0.1 µm, about 0.2 µm, about 0.3 µm, about 0.4 µm, about 0.5 µm, about 0.6 µm, about 0.7 µm, about 0.8 µm, about 0.9 µm, about 1 µm, about 1.5 µm, about 2 µm, about 2.5 µm, about 3 µm, about 3.5 µm, about 4 µm, about 4.5 µm, about 5 µm, about 5.5 µm, about 6 µm, about 6.5 µm, about 7 µm, about 7.5 µm, about 8 µm, about 8.5 µm, about 9 µm, about 9.5 µm, or about 10 µm.

Although not shown in FIGS. 1A and 1B, the polarizing plate may further include an adhesive layer, for example, a pressure-sensitive adhesive layer, on a lower surface of the second protective film 30 to stack the polarizing plate on an optical display panel.

Next, an optical display apparatus according to an embodiment of the present invention will be described.

The optical display apparatus according to an embodiment of the present invention may include the polarizer or the polarizing plate according to the present invention. The optical display apparatus may include at least one of a liquid crystal display and a light emitting display. The light emitting display may include an organic/inorganic light emitting element as a light emitting element, for example, any of a light emitting diode (LED), an organic light emitting diode (OLED), a quantum dot light emitting diode (QLED), and a light emitting material, such as phosphors.

Figure 3:
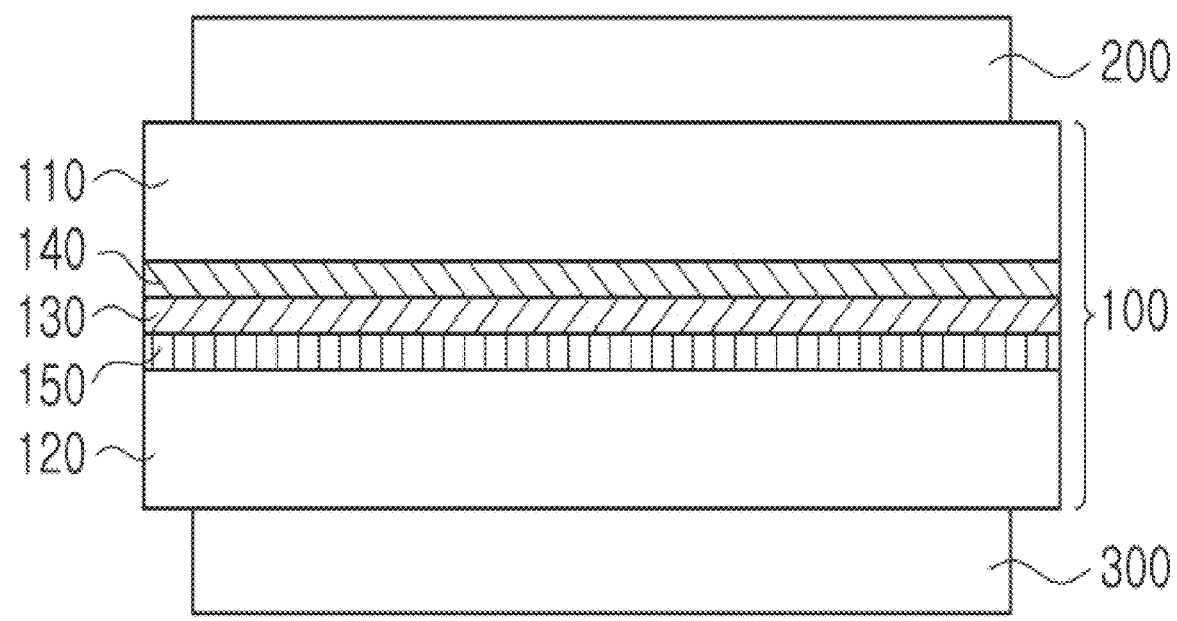
FIG. 3 is a cross-sectional view of an optical display apparatus according to an embodiment of the present invention.

Referring to FIG. 3, the liquid crystal display may include an in-cell type liquid crystal panel 100, a first polarizing plate 200 disposed on a light exit surface of the in-cell type liquid crystal panel 100, and a second polarizing plate 300 disposed on a light incident surface of the in-cell type liquid crystal panel 100, wherein at least one of the first polarizing plate 200 and the second polarizing plate 300 may include the polarizing plate according to the present invention.

The in-cell type liquid crystal panel 100 may include a first substrate 110, a second substrate 120 disposed opposite to the first substrate 110, a liquid crystal layer 130 disposed between the first substrate 110 and the second substrate 120, a touch sensor layer 140 disposed between the first substrate 110 and the liquid crystal layer 130, and a drive electrode and a sensor layer 150 disposed between the liquid crystal layer 130 and the second substrate 120.

In an embodiment, when one of the first polarizing plate 200 and the second polarizing plate 300 includes the polarizing plate according to the present invention, the other polarizing plate may include a typical polarizing plate well-known to those skilled in the art.

Although not shown in FIG. 3, solid remnants of metal powder-containing pastes may remain in the first polarizing plate 200 and in the in-cell type liquid crystal panel 100. The metal powder-containing pastes are the same as described above.

Next, the present invention will be described in more detail with reference to some examples. However, it should be noted that these examples are provided for illustration only and are not to be construed in any way as limiting the present invention.

Example 1

A polyvinyl alcohol film (VF-TS#2000, hydrophobic polyvinyl alcohol resin, thickness: 20 µm, Kuraray Co., Ltd.) washed with water at 25° C. was subjected to a swelling process in a water swelling bath at 30° C.

After the swelling process, the film was dipped in a dyeing bath filled with an aqueous solution containing 1 mol/ml potassium iodide and 1 wt % of boric acid at 30° C. for 65 seconds. Thereafter, the film was dipped in a cross-linking bath filled with an aqueous solution containing 2.5 wt % of boric acid at 30° C. for 30 seconds.

After the crosslinking process, the film was stretched in a stretching bath filled with an aqueous solution containing 2.5 wt % of boric acid at 55° C.

The polyvinyl alcohol film was stretched to a total elongation of 5.0 times or more of an initial length thereof through the washing process, the swelling process, the dyeing process, the crosslinking process, and the stretching process. Then, the film was dipped in a color-correcting bath, which was filled with an aqueous solution for color correction containing 3.5 wt % of potassium iodide, at 20° C. for 10 seconds.

After the color-correcting process, the film was washed with water and dried at 60° C., thereby manufacturing a polarizer (thickness: 7 µm).

The polarizer had a surface roughness (Ra) of 1.1 nm and a difference of 0 nm in surface roughness (Ra) between opposite surfaces thereof.

A triacetylcellulose film having a hard coating layer was bonded to an upper surface of the polarizer via a water-based bonding agent (prepared by melting polyvinyl alcohol resin powder in water at 95° C. while stirring the powder, followed by adding a heat curable aldehyde crosslinking agent), and a triacetylcellulose film was bonded to a lower surface of the polarizer via a water-based bonding agent (prepared by melting polyvinyl alcohol resin powder in water at 95° C. while stirring the powder, followed by a heat curable aldehyde crosslinking agent), thereby manufacturing a polarizing plate (each of the bonding layers having a thickness of 50 nm to 80 nm).

Examples 2 to 4

Polarizers and polarizing plates were manufactured in the same manner as in Example 1 except that the contents in each of the dyeing bath, the crosslinking bath, and the stretching bath were changed together with the concentration of boric acid, the stretching temperature, and/or the drying temperature in the stretching bath, as listed in Table 1.

Example 5

A photocurable bonding agent comprising a (meth)acrylic compound including a hydroxyl group-containing (meth)acrylate, an epoxy compound including an alicyclic epoxy resin, a cationic photoinitiator including an onium salt, and a phosphorus-based photoradical initiator was prepared. A polarizing plate (each of the bonding layers having a thickness of 2 µm to 3 µm) was manufactured in the same manner as in Example 1 except that the prepared photocurable bonding agent was used instead of the water-based bonding agent.

Comparative Example 1

A polyvinyl alcohol film (VF-TS#3000, hydrophilic polyvinyl alcohol resin, thickness: 30 µm, Kuraray Co., Ltd.) washed with water at 25° C. was subjected to a swelling process in a water swelling bath at 30° C.

After the swelling process, the film was dipped in a dyeing bath filled with an aqueous solution containing 1 mol/ml potassium iodide and 1 wt % of boric acid at 30° C. for 65 seconds. Thereafter, the film was dipped in a crosslinking bath filled with an aqueous solution containing 2.5 wt % of boric acid at 30° C. for 30 seconds. After the crosslinking process, the film was stretched in a stretching bath filled with an aqueous solution containing 2.5 wt % of boric acid at 50° C.

The polyvinyl alcohol film was stretched to a total elongation of 5.0 times or more of an initial length thereof through the washing process, the swelling process, the dyeing process, the crosslinking process, and the stretching process.

Then, the film was dipped in a color-correcting bath, which was filled with an aqueous solution for color correction containing 3.5 wt % of potassium iodide at 20° C. for 10 seconds. After the color-correcting process, the film was washed with water and dried at 60° C., thereby manufacturing a polarizer (thickness: 12 µm).

A polarizing plate was manufactured using the polarizer in the same manner as in Example 1.

Comparative Example 2

A polyvinyl alcohol film (VF-TS#2000, hydrophobic polyvinyl alcohol resin, thickness: 20 µm, Kuraray Co., Ltd.) washed with water at 25° C. was subjected to a swelling process in a water swelling bath at 30° C.

After the swelling process, the film was dipped in a dyeing bath filled with an aqueous solution containing 1 mol/ml potassium iodide and 1 wt % of boric acid at 30° C. for 65 seconds. Thereafter, the film was dipped in a crosslinking bath filled with an aqueous solution containing 2.5 wt % of boric acid at 30° C. for 30 seconds.

After the crosslinking process, the film was stretched in a stretching bath filled with an aqueous solution containing 3.5 wt % of boric acid at 50° C.

The polyvinyl alcohol film was stretched to a total elongation of 5.0 times or more of an initial length thereof through the washing process, the swelling process, the dyeing process, and the crosslinking process. Then, the film was dipped in a color-correcting bath, which was filled with an aqueous solution for color correction containing 3.5 wt % of potassium iodide at 20° C. for 10 seconds.

After the color-correcting process, the film was washed with water and dried at 100° C., thereby manufacturing a polarizer (thickness: 7 µm).

A polarizing plate was manufactured using the polarizer in the same manner as in Example 1.

Property Evaluation (1) Surface roughness of polarizer (unit: nm): Surface roughness Ra, Rz, and Rq of each polarizer was measured using a surface roughness tester (Park XE-100 AFM, Park Systems, Korea). In a non-contact mode of the AFM (Atomic Force Microscope), a three-dimensional shape of a specimen could be obtained by measuring interactive force between atoms when a fine probe was placed near a surface of the specimen. A surface roughness image was obtained in a measurement range of 1 µm×1 µm, with the probe placed near the surface of the polarizer, and data was obtained in 512 pixels in each of X and Y directions with a scan rate of 1 Hz.

(2) A specimen was prepared by adhesively attaching a release film (PET film) having an adhesive layer to an upper surface of each of the polarizing plates manufactured in the Examples and Comparative Examples. The prepared specimen was adhesively attached to a glass plate via a (meth) acrylic pressure-sensitive adhesive layer. 0.5 g of silver powder-containing pastes (comprising 48 wt % of flake type silver powder having an average particle diameter (D50) of 5.0 µm, 10 wt % of binder (cellulose acetate butylate), and 42 wt % of a solvent (PGMEA) (SCPW-6, Electro-Lube Co., Ltd.) was deposited to a thickness of 200 µm on the polarizing plate in the thickness direction thereof and was left in a chamber at 60° C. and 95% RH for 240 hours. A silver ion ($Ag^+$) infiltration length between the polarizer and the protective film of the polarizing plate was measured using an optical microscope (ML61L, Olympus Co., Ltd.) to obtain the maximum infiltration length. Results are shown in Table 1 and FIGS. 4A and 4B.

TABLE 1

|  | Example | | | | | Comparative Example | |
| --- | --- | --- | --- | --- | --- | --- | --- |
| PVA film | 1<br>Hydrophobic | 2<br>Hydrophobic | 3<br>Hydrophobic | 4<br>Hydrophobic | 5<br>Hydrophobic | 1<br>Hydrophilic | 2<br>Hydrophobic |
| Boric acid in stretching bath (wt %) | 2.5 | 3.0 | 3.0 | 3.4 | 2.5 | 2.5 | 3.5 |
| Stretching Temp. (° C.) | 55 | 53 | 50 | 50 | 55 | 50 | 50 |
| Drying Temp. (° C.) | 60 | 60 | 60 | 60 | 60 | 60 | 100 |
| Surface roughness of polarizer (Ra) (nm) | 1.1 | 4.5 | 8.2 | 10 | 1.1 | 0.8 | 15.7 |

TABLE 1-continued

| PVA film | Example | | | | | Comparative Example | |
| --- | --- | --- | --- | --- | --- | --- | --- |
| | 1 Hydrophobic | 2 Hydrophobic | 3 Hydrophobic | 4 Hydrophobic | 5 Hydrophobic | 1 Hydrophilic | 2 Hydrophobic |
| Difference in surface roughness (Ra) between opposite surfaces of polarizer (nm) | 0 | 0 | 0 | 0 | 0 | 0.2 | 4.8 |
| Surface roughness (Rz) of polarizer (nm) | 8.4 | 32.4 | 60.7 | 73.8 | 8.4 | 5.6 | 114.8 |
| Surface roughness (Rq) of polarizer (nm) | 1.42 | 5.6 | 10.2 | 12.3 | 1.42 | 1.15 | 19.5 |
| Maximum metal ion-infiltration length (μm) | 141 | 85 | 42 | 28 | 102 | 784 | 542 |

As shown in Table 1, the polarizing plate according to the present invention could minimize or reduce infiltration of metal ions between the polarizer and the protective film. As a result, the polarizing plate according to the present invention could provide an effect of removing static electricity upon removal of a release film from the polarizing plate after the release film having an adhesive layer attached thereto was stacked on the polarizing plate, without affecting a polarization function and luminous efficacy of the polarizing plate.

On the contrary, the polarizing plates of Comparative Examples 1 and 2 had a maximum metal ion-infiltration length of greater than 400 μm between the polarizer and the protective film, thereby failing to achieve the effects of the present invention.

Figure 4A:
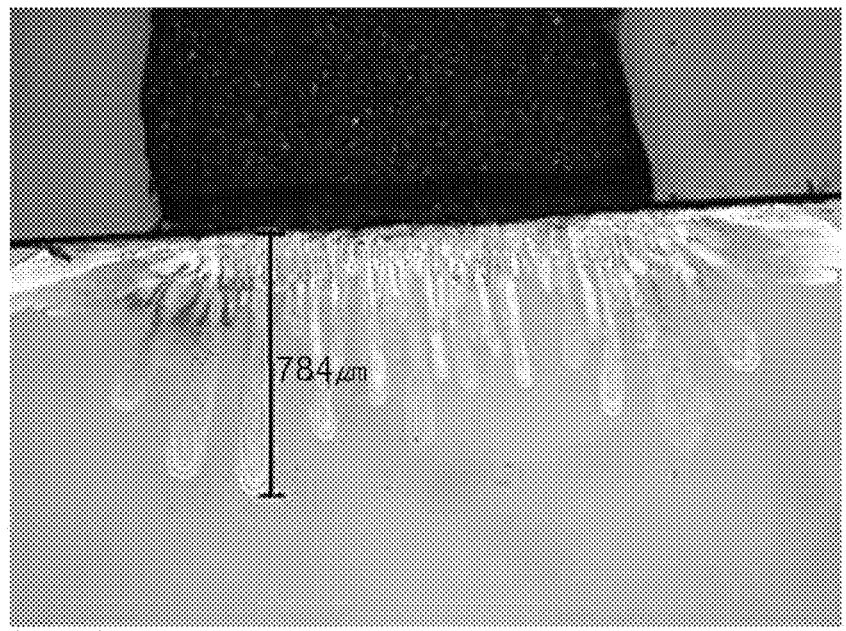
FIGS. 4A and 4B are pictures respectively showing an infiltration length of metal ions in polarizing plates of Comparative Example 1 and Example 1.
Figure 4B:
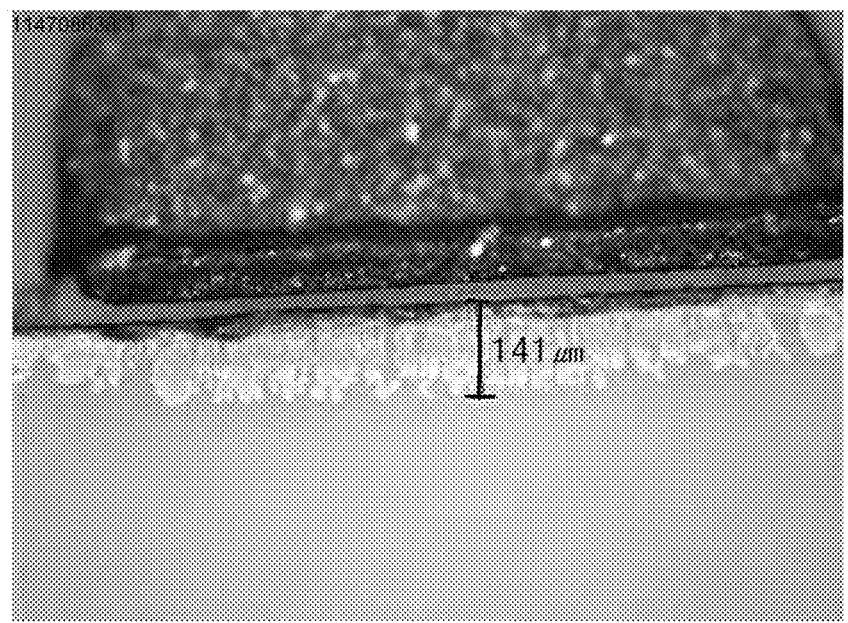

From FIGS. 4A and 4B, it could be seen that the maximum metal ion-infiltration length of the polarizing plate of Example 1 (corresponding to FIG. 4B) was much less than the maximum metal ion-infiltration length of the polarizing plate of Comparative Example 1 (corresponding to FIG. 4A).

While some embodiments have been described herein, it should be understood that these are not limiting, and various modifications, changes, alterations, and equivalent embodiments can be made by those skilled in the art without departing from the spirit and scope of the invention.

What is claimed is:

1. A polarizing plate comprising a polarizer and a protective film stacked on at least one surface of the polarizer,
    wherein the polarizer comprises a hydrophobic polyvinyl alcohol resin and has a surface roughness (Ra) of about 10 nm or less on a surface thereof facing the protective film,
    the polarizing plate having a maximum metal ion-infiltration length of about 400 μm or less between the polarizer and the protective film when metal powder-containing pastes are deposited on a surface of the polarizing plate in a thickness direction thereof and left at 60° C. and 95% relative humidity (RH) for 240 hours.

2. The polarizing plate according to claim 1, wherein the polarizer has a surface roughness (Rz) of about 0 nm to about 80 nm on the surface thereof facing the protective film and a surface roughness (Rq) of about 0 nm to about 20 nm on the surface thereof facing the protective film.

3. An optical display apparatus comprising the polarizing plate according to claim 2.

4. The polarizing plate according to claim 1, wherein the polarizer has a difference of about 5 nm or less in surface roughness (Ra) between opposite surfaces thereof.

5. An optical display apparatus comprising the polarizing plate according to claim 4.

6. The polarizing plate according to claim 1, wherein the hydrophobic polyvinyl alcohol resin contains an unsubstituted $C_1$ to $C_{20}$ hydrocarbon group as a hydrophobic functional group.

7. An optical display apparatus comprising the polarizing plate according to claim 6.

8. The polarizing plate according to claim 1, wherein the hydrophobic polyvinyl alcohol resin comprises a copolymer of a monomer mixture comprising at least one vinyl ester monomer and a monomer providing a hydrophobic functional group.

9. The polarizing plate according to claim 8, wherein the monomer providing the hydrophobic functional group comprises a monomer having a $C_1$ to $C_{20}$ hydrocarbon repeat unit.

10. An optical display apparatus comprising the polarizing plate according to claim 9.

11. An optical display apparatus comprising the polarizing plate according to claim 8.

12. The polarizing plate according to claim 1, wherein the polarizer has a thickness of about 12 μm or less.

13. An optical display apparatus comprising the polarizing plate according to claim 12.

14. The polarizing plate according to claim 1, wherein the protective film comprises at least one selected from among a cellulose ester resin, a cyclic polyolefin resin, a polycarbonate resin, a polyester resin, a polyether sulfone resin, a polysulfone resin, a polyamide resin, a polyimide resin, a non-cyclic polyolefin resin, a polyacrylate resin, a polyvinyl alcohol resin, a polyvinyl chloride resin, a polyvinylidene chloride resin, and an acrylic resin.

15. An optical display apparatus comprising the polarizing plate according to claim 14.

16. The polarizing plate according to claim 1, wherein the polarizer is bonded to the protective film via a bonding layer, the bonding layer having a thickness of about 0.01 μm to about 10 μm.

17. An optical display apparatus comprising the polarizing plate according to claim 16.

18. An optical display apparatus comprising the polarizing plate according to claim 1.

* * * * *